US012297898B2

(12) United States Patent
Knaus et al.

(10) Patent No.: US 12,297,898 B2
(45) Date of Patent: May 13, 2025

(54) VENTILATION MODULE FOR A TRANSMISSION OF A MOTOR VEHICLE, IN PARTICULAR OF AN ELECTRICALLY DRIVEN MOTOR VEHICLE

(71) Applicant: BRUSS SEALING SYSTEMS GMBH, Hoisdorf (DE)

(72) Inventors: Artur Knaus, Hamburg (DE); Manfred Brand, Tremsbüttel (DE); Andy Maruhn, Schossin (DE); Heiko Waldmann, Mölln (DE); Stefan Rust, Hamburg (DE)

(73) Assignee: BRUSS SEALING SYSTEMS GMBH, Hoisdorf (DE)

( * ) Notice: Subject to any disclaimer, the term of this patent is extended or adjusted under 35 U.S.C. 154(b) by 0 days.

(21) Appl. No.: 18/375,029

(22) Filed: Sep. 29, 2023

(65) Prior Publication Data

US 2024/0133458 A1    Apr. 25, 2024
US 2024/0229915 A9    Jul. 11, 2024

(30) Foreign Application Priority Data

Oct. 21, 2022   (DE) ................ 10 2022 003 912.5

(51) Int. Cl.
*F16H 57/02*    (2012.01)
*F16H 57/027*   (2012.01)

(52) U.S. Cl.
CPC ................... *F16H 57/027* (2013.01)

(58) Field of Classification Search
CPC ....................................................... F16H 57/027
See application file for complete search history.

(56) References Cited

U.S. PATENT DOCUMENTS

| 3,620,240 A * | 11/1971 | Bogdanski ............. F16K 17/18 |
| | | 137/202 |
| 8,550,107 B2 | 10/2013 | Roscher et al. |
| 9,366,102 B2 * | 6/2016 | Varney .................... E21B 33/03 |

FOREIGN PATENT DOCUMENTS

| CN | 112096836 A  * | 12/2020 | .......... F16H 57/027 |
| DE | 42 24 611 A1 | 1/1994 | |
| DE | 10 2013 104 115 A1 | 11/2014 | |
| DE | 102019008935 A1 * | 6/2021 | ............. F16K 17/12 |

(Continued)

OTHER PUBLICATIONS

Search Report issued by the German Patent Office with respect to the German priority application No. 10 2022 003 912.5.

*Primary Examiner* — Thomas C Diaz
(74) *Attorney, Agent, or Firm* — SALIWANCHIK, LLOYD & EISENSCHENK

(57) ABSTRACT

A ventilation module for a transmission of a motor vehicle, in particular an electrically driven motor vehicle, comprises a housing with a connection opening on the transmission side and an atmosphere opening open to the environment, wherein a gas channel connecting the connection opening to the atmosphere opening in a gas-conducting manner is provided in the housing. A float valve with a float arranged in a float chamber, a valve body and a valve opening is arranged in the gas channel, wherein liquid entering the float chamber through the atmosphere opening causes the float to rise, wherein when a certain liquid level in the float chamber is exceeded the float, the valve body connected to the float, closes the valve opening and thereby the gas channel in a liquid-tight manner.

18 Claims, 3 Drawing Sheets

(56) References Cited

FOREIGN PATENT DOCUMENTS

| | | |
|---|---|---|
| DE | 10 2020 007 730 A1 | 6/2022 |
| EP | 0 568 005 A1 | 4/1993 |
| EP | 2 008 858 B1 | 7/2012 |
| EP | 2 273 860 B1 | 9/2012 |

* cited by examiner

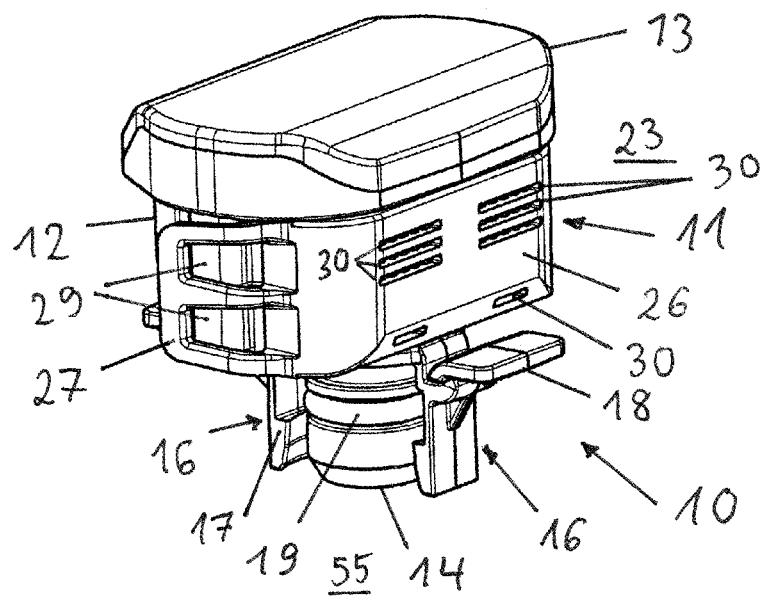
Fig. 1
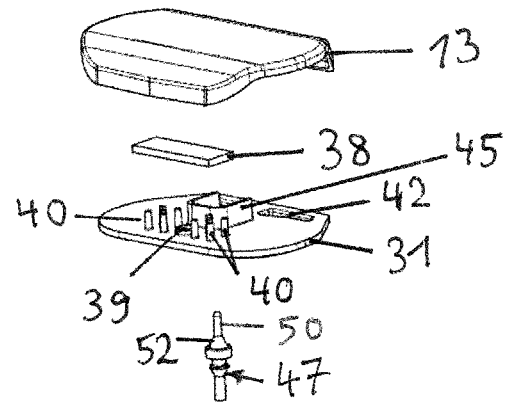
Fig. 2
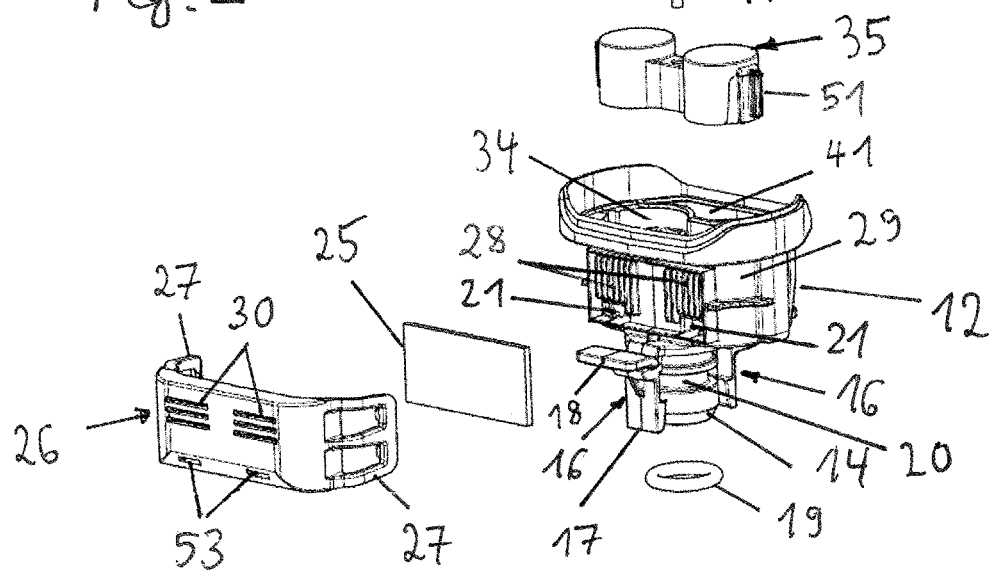

VENTILATION MODULE FOR A TRANSMISSION OF A MOTOR VEHICLE, IN PARTICULAR OF AN ELECTRICALLY DRIVEN MOTOR VEHICLE

CROSS-REFERENCE TO RELATED APPLICATION

This application claims priority to German Patent Application No. 10 2022 003 912.5, filed on Oct. 21, 2022; which is incorporated in its entirety herein.

FIELD OF THE INVENTION

The present invention relates to a ventilation module for a transmission of a motor vehicle, in particular an electrically driven motor vehicle, comprising a housing with a connection opening on the transmission side and an atmospheric opening open to the environment, wherein a gas channel connecting the connection opening to the atmospheric opening in a gas-conducting manner is provided in the housing.

BACKGROUND OF THE INVENTION

In the case of hermetic sealing, fluctuations in operating temperature in the transmission or drive would lead to high pressure fluctuations, which in turn would be negative for the sealing system, in particular for a rotary shaft seal. Venting to the environment is therefore required. Regional regulations also require a high wading capacity, or water tightness. Without suitable action, venting to the environment would be an entry point for water and dirt, which is harmful to oil and drive components and causes corrosion, including of electronic components.

Furthermore, oil components in the vent air should be retained during venting. The service life of the ventilation component should be that of the vehicle life, and maintenance of the components is not planned.

Simple bore vents are known, but they do not prevent water and dirt from entering, nor do they prevent oil from escaping; a light but visible oil film forms in the area of the outlet.

Furthermore, modules arranged in series are known that separate the gas path via check valves for aeration and ventilation. The aeration includes a hydrophobic membrane. Disadvantages are the relatively high pressure fluctuations due to the valve preload, which is required for the reliable closing of the check valves, and the strong temperature dependence due to the material properties of the check valve designed as a diaphragm valve.

BRIEF SUMMARY

It is the task of the invention to provide a ventilation module that ensures lifelong aeration and ventilation without allowing water to enter the transmission. Also undesirable is the emission of oil droplets into the environment and the entry of dirt or dust into the transmission.

The invention solves this problem with the features of claim 1. According to the invention, a float valve with a float arranged in a float chamber, a valve body and a valve opening is arranged in the gas channel, wherein liquid entering the float chamber through the atmosphere opening causes the float to rise, wherein when a certain liquid level in the float chamber is exceeded, the valve body connected to the float closes the valve opening and thereby the gas channel in a liquid-tight manner.

When the atmosphere opening is under water, water enters the float chamber, lifts the float and closes the valve opening and thus the gas channel via the valve body, and thus the gas- and liquid-conducting connection with the transmission or the power unit. It can be assumed that this process takes only a relatively short time, so that no appreciable gas pressures can build up despite the closed gas channel, and/or the advantages of watertightness outweigh any increase in pressure.

Preferably, an oil separating device is arranged in the gas channel for separating oil components from vent air flowing from the connection opening to the atmosphere opening. In a preferred embodiment, the oil separating device comprises an impact separator with an impact element, which can be designed in particular as an impactor fleece. The oil separating device, in particular the impact element or fleece separator, removes oil droplets from outflowing gases. Preferably, the oil separating device is arranged in the venting direction between the connection opening and the float valve, so that oil separation takes place before the vent gas enters the float chamber.

To increase the separation efficiency, the oil separating device can include a guiding device for (further) diverting the vented gas flow. Separated agglomerated droplets cannot follow the gas flow and drain into the oil reservoir.

Preferably, a drain-free oil reservoir is arranged in the housing such that oil separated by the oil separating device drains into the oil reservoir by gravity. Accordingly, the separated oil is collected in an oil reservoir that is sufficiently large for the service life. It is advantageous for a long service life if only small quantities of oil escape and the gas extraction takes place in an oil-cleaned location. The purified gas is added to the environment via the atmosphere opening.

In a preferred embodiment, a separator element is arranged in the housing, which separates an interior of the housing into an upper region and a lower region in which the float chamber is arranged. The separating element may advantageously comprise or form one or more of the following features: a valve seat for the valve body surrounding the valve opening; at least one retaining element for retaining an impact element of an impact separator; a gas passage opening directed in particular towards an impact element of an impact separator; an oil drain opening for draining oil from the upper region into an oil reservoir. Thus, it is a multifaceted functional element. Preferably, the gas passage opening and/or the valve opening is surrounded by a collar to prevent the unintentional discharge of separated oil through these openings.

An impact element of an impact separator, for example an impactor fleece, can be retained on the cover by the separator element via one or more retaining elements, for example plastic pins. The retaining element or elements can also serve as an oil return from the impact element to the separator element. The separating element advantageously comprises a slope to an oil drain opening to the oil reservoir. The unit comprising the cover and the separating element is preferably connected to the housing in a gas-tight manner, for example welded. Alternatively, the separator plate is connected to the housing, and the unit comprising the separator plate and the housing is connected to the cover in a gas-tight manner.

The float can be designed to be open or closed at the bottom. The valve body is attached to the float. The valve body is preferably made of an elastomer or a thermoplastic elastomer; elastomer seals well against thermoplastic plastic, which advantageously makes up the separating element with the valve seat. Preferably, the valve body comprises a pin-shaped part, which is slidably guided with clearance in the valve opening, which contributes to a secure closing of the float valve. The valve body guide provides additional security when the motor vehicle is not perfectly horizontal and centers the float and float valve.

Preferably, a filter element covering the atmosphere opening is provided. To ventilate the transmission, the air of the atmosphere is cleaned of dust and dirt via the filter element and supplied to the transmission or the power unit via the float chamber. Preferably, a filter cover for holding the filter element is provided between the filter cover and the housing. The filter element can, for example, be clipped in front of the housing with a filter cover for ease of installation, or alternatively be welded firmly in place, in which case a filter cover may be omitted.

Preferably, a connection element is provided in the area of the connection opening for connecting the ventilation module to the transmission. Preferably, a sealing element is provided for sealing the connection opening. This is done either radially by an O-ring or axially by a profile seal. Preferably, a fastening element is provided on the housing for detachable fastening of the ventilation module to the transmission.

For maintenance purposes of the transmission/unit, there is thus preferably a releasable clip mechanism. The ventilation module can be tightly sealed to the transmission/unit in the manner described and can advantageously be latched.

The gas paths for aeration and ventilation in the gas channel are the same, but in the opposite direction in each case.

BRIEF DESCRIPTION OF THE FIGURES

The invention is explained below by means of preferred embodiments with reference to the accompanying figures. Thereby shows FIG. 1 a perspective view of a ventilation module;

FIG. 2 an exploded view of the ventilation module;

DETAILED DESCRIPTION

Figure 3:
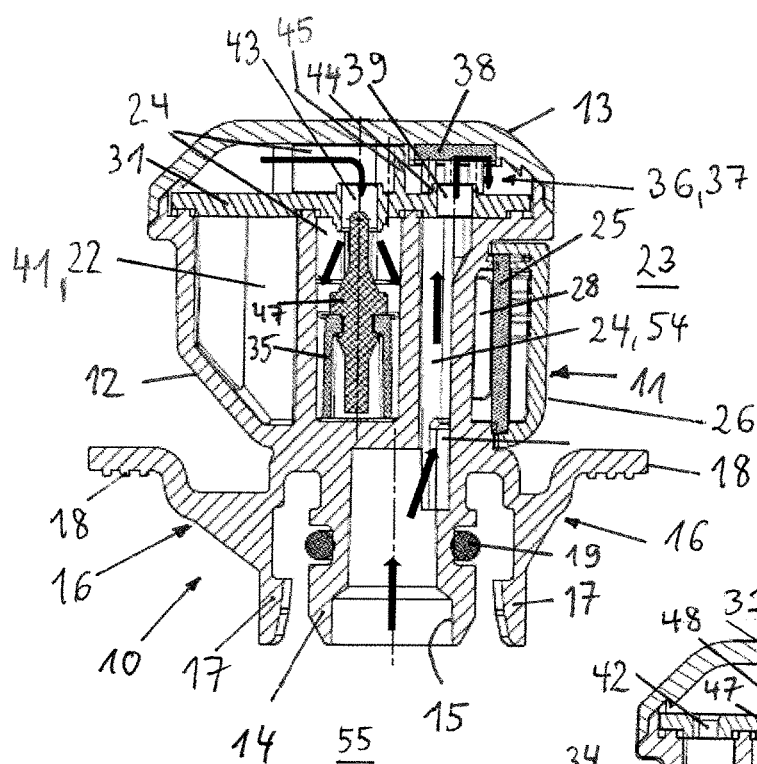
FIG. 3 a cross-sectional view through the ventilation module illustrating the gas path in the venting case.

The ventilation module 10 comprises, for example, a two-part housing 11 with a base body 12 and a cover 13. The housing 11 is adapted for gas-conducting connection to a transmission 55, which is not shown, and comprises for this purpose a connecting element 14 for connecting the ventilation module 10 to the transmission 55. The connection element 14 is, for example, a pipe socket adapted to be inserted into a corresponding receptacle in the transmission housing. A reverse arrangement is possible, according to which the ventilation module 10 comprises a receptacle for insertion of a pipe socket of the transmission housing.

For fastening the ventilation module 10 to the transmission 55, in particular in a detachable manner, the housing 11 further comprises one or more fastening elements 16, for example two fastening elements 16, which interacts with a corresponding fastening element on the transmission 55, which is not shown. The at least one fastening element 16, which is explained below with reference to FIG. 3, is preferably a latching element with a latching hook 17 which is adapted to latch in a corresponding, not shown, latching receptacle of the transmission. The at least one fastening element 16 preferably comprises an actuating element 18, the manual actuation of which results in unlocking of the latching hook 17 so that the ventilation module 10 can be removed from the transmission 55, for example for maintenance purposes or for draining the oil reservoir 41 (see below). A reverse arrangement is possible, according to which the housing 11 comprises a latching receptacle for latchingly receiving a latching hook of the transmission 55.

A connection opening 15 is provided in the housing 11 on the transmission side, through which gas can flow from the transmission 55 into the interior of the housing 11 or vice versa when the ventilation module 10 is mounted, depending on the pressure conditions in the transmission 55 relative to atmospheric pressure. The connection element 14 preferably forms or surrounds the connection opening 15 so that gas can flow through the connection element 14 and the connection opening 15 into the housing 11, and vice versa.

A sealing element 19, for example a sealing ring, surrounding the connection opening 15 is preferably provided for sealing the ventilation module 10 against the transmission 55. The sealing element 19 may, for example, be arranged in an annular groove 20 (see FIG. 2) on the outer circumference of the connection element 14.

The housing 11 comprises one or more, here for example two, atmosphere openings 21, which connect the interior 22 of the housing 11 with the environment 23 or the environment or the atmosphere. In the following, the atmospheric opening 21 will be referred to throughout, because the number thereof is not important for the function of the ventilation module 10. In the interior 22 of the housing 11, a gas channel 24 connects the connection opening 15 to the atmosphere opening 21.

Figure 4:
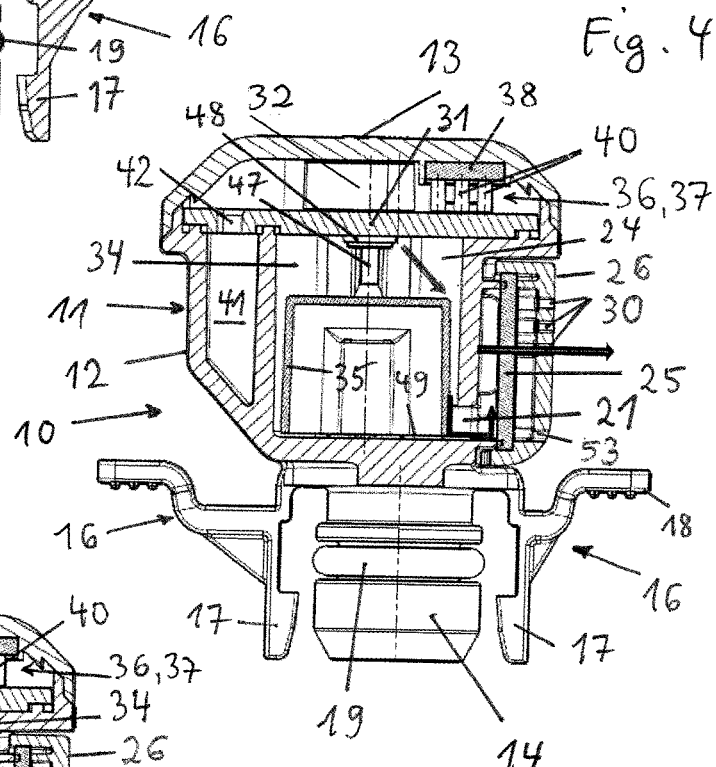
FIG. 4 a cross-sectional view through the ventilation module in a sectional plane parallel to FIG. 3 to further illustrate the vent gas path.

When an overpressure relative to atmospheric pressure is present in the transmission 55 connected to the connection opening 15 (venting case), gas flows from the transmission 55 through the connection opening 15, further through the gas channel 24 to the atmospheric opening 21 and through it to the surroundings 23. The flow path in the previously described venting case is marked with black arrows in FIGS. 3 and 4; the flow path will be explained in more detail below. The term "gas channel" 24 does not imply any restriction with respect to its shape, course and cross-section.

If there is a negative pressure relative to atmospheric pressure in the transmission 55 connected to the connection opening 15 (aeration case), gas flows from the environment 23 through the atmosphere opening 21 into the interior 22 of the housing 11 and from there further through the gas channel 24 to the connection opening 15 and through this into the connected transmission 55. The flow path in this aeration case is thus the reverse of the black arrows in FIGS. 3 and 4.

In the area of the atmosphere opening 21, a filter element 25 is preferably provided, which is arranged in such a way that air flowing from the surroundings 23 through the atmosphere opening 21 into the interior 22 is forced to pass through the filter element 25. The incoming air is thus cleaned of dust and dirt via the filter element 25 before entering the gas channel 24. The filter element 25 may be held to the housing 11 internally or, as here, externally by means of a filter cover 26. For example, rib-shaped spacer elements 28 (see FIG. 2) can be provided on the housing 11 for holding the filter element 25 at a distance from a housing wall. The filter cover 26 is preferably detachably connected to the housing 11, for example in an assembly-friendly manner by means of clips or latching elements 27 which detachably latch to the housing 11 with corresponding latching protrusions 29. A screw connection or welding of the cover element 26 to the housing 11 is also conceivable. The filter cover 26 comprises expediently air passage openings 30 to allow the passage of air from the environment 23 to the atmosphere opening 21 and vice versa.

Alternatively, the filter element 25 can be directly attached to the housing 11, for example welded to it at its periphery. In this case, a filter cover may be omitted.

The ventilation module 10 preferably comprises a separating element 31, for example a separating or intermediate plate or wall. The separating element 31 divides the interior 22 of the housing 11 into two areas, namely an upper region 32, i.e. the space between the separating element 31 and the cover 13, which serves in particular for oil separation of vented gas, and a lower area 33, i.e. the space in the base body 12 below the separating element 31, which serves in particular to form a float chamber 34, an oil reservoir 41 and a connection-side channel section 54 (see below). The separating element 31 may advantageously be held between the housing 11 and the cover 13. The indications "above" and "below" herein and generally in the context of this application refer to a vertical direction defined by the direction of movement and position of the float 35, as will be explained further below with reference to FIGS. 6 and 7.

Preferably, an oil separating device 36 is arranged in the flow path of the gas channel 24. The oil separating device 36 is arranged such that gas flowing in the venting direction (FIGS. 3 and 4) is cleaned of oil droplets contained therein by separating them by the oil separating device 36.

Preferably, the oil separating device 36 comprises an impact separator 37. The impact separator 37 comprises an impact element 38 and a cross-sectionally narrowing gas passage opening 39, which acts as a nozzle and directs and accelerates gas flowing in the venting direction and through the gas passage opening 39 onto the impact element 38. The impact element 38 advantageously comprises a surface oriented perpendicularly to the gas flow directed thereon, so that the gas incident on the impact element 38 is sharply deflected by at least 90°, as shown in FIG. 3. Due to this accelerated deflection, liquid or oil droplets contained in the deflected gas are separated on the impact element 38 due to inertia.

The oil separating device 36 is not limited to an impact separator 37. Other oil separators are possible, for example a vortex chamber separator, such as a cyclone separator, or a spring tongue separator.

The passage opening 39 is preferably arranged in the separating element 31, see FIGS. 2 and 3. The impact element 38 is preferably a fleece element, which may therefore also be referred to as an impactor fleece. The impact element 38 may, for example, be held on the underside of the cover 13. For this purpose, the separating element 31 may have one or more, for example pin-shaped, retaining elements 40 which extend upwards from the separating element 31 and hold the impact element 38 on the underside of the cover 13. Other means of fastening of the impact element 38 to the cover 13 are possible, for example by welding. Embodiments without a separate impact element are possible, in which case, for example, a portion of the cover 13 forms the impact element.

The separated oil drains by gravity into an oil reservoir 41. Preferably, the oil reservoir 41 is arranged in the lower region 33, i.e., in the interior of the base body 12 below the separating element 31. The separated oil then preferably runs on the upper side of the separating element 31 to an oil drain opening 42 in the separating element 31 and through this into the oil reservoir 41. The separating element 31 or the separating plate can comprise a slight inclination towards the oil drain opening 42 for this purpose. The gas passage opening 39 and the float valve opening 43 (see below) in the separating element 31 are advantageously surrounded by a raised collar 44 to prevent the separated oil from flowing off unintentionally through these openings 39, 43.

The oil reservoir 41 comprises no drain, so that the oil stored therein is trapped therein. The size of the oil reservoir 41 is such that it is sufficient to store the oil separated over the life of the transmission 55.

In addition to the impact separator 37, in particular in the flow direction behind it, or alternatively to the impact separator 37, the oil separating device 36 may comprise a guiding device 45 for (further) gas diversion of the vent gas in the upper region 32, whereby an increased oil separation efficiency is achievable. The guide means 45 may be, for example, a U-shaped wall surrounding the float valve opening 43, wherein the opening of the U-shaped wall faces away from the gas passage opening 39, such that a direct vent gas flow from the gas passage opening 39 to the float valve opening 43 is prevented. The guiding device 45 thus forms a labyrinth separator; other forms of a labyrinth separator are possible. The guide means 45 may also be partially or completely formed on the cover 13.

The purified vent gas exits downwardly through the valve opening 43 from the upper region 32, which is also referred to as the separation chamber, to flow from there to the atmospheric opening 21 and exit through it to the environment.

Figure 5:
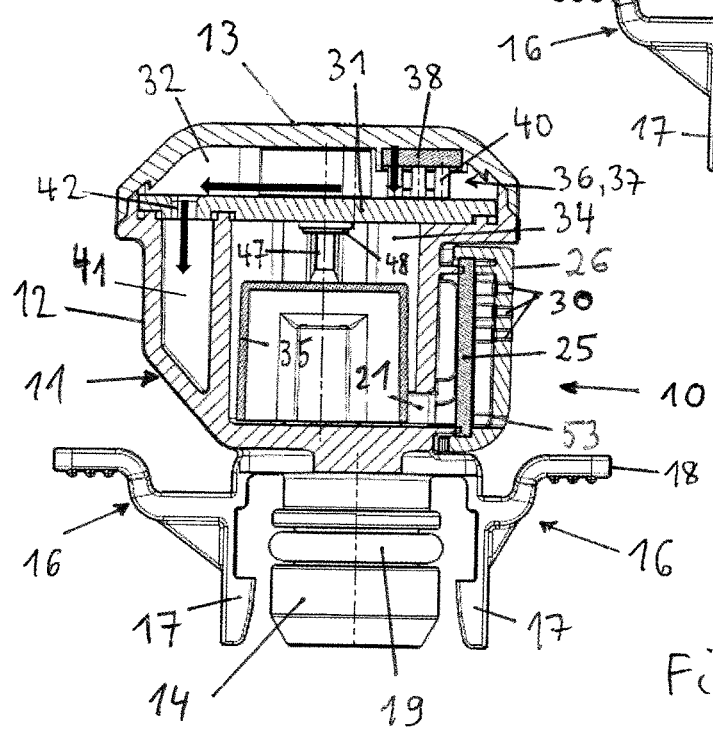
FIG. 5 a cross-sectional view through the ventilation module as in FIG. 4 illustrating the oil drain path.
Figure 6:
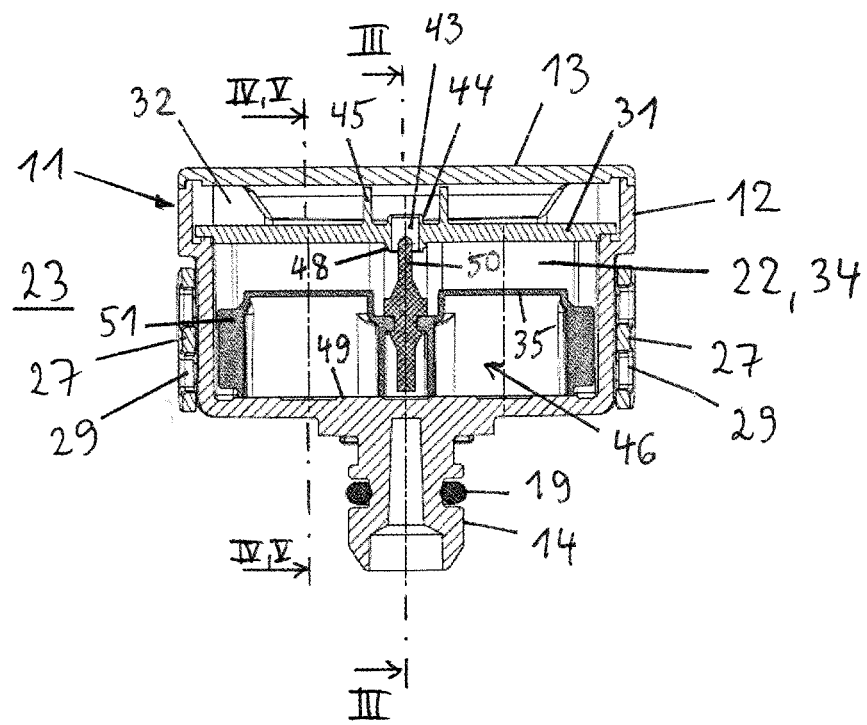
FIG. 6 a cross-sectional view from a viewing direction perpendicular to FIGS. 3 to 5 with the float valve open.

A float valve 46 is arranged in the flow path of the gas channel 24, which comprises a float 35 arranged in a float chamber 34, a valve body 47 and a valve seat 48 surrounding the valve opening 43. The float chamber 34 is part of the gas channel 24 and in particular the space below the valve opening 43. The valve body 47 is attached to the float 35 as can be seen in FIGS. 3, 5 and 6. The float 35 is guided vertically displaceable in the float chamber 35, between a lower open position according to FIGS. 3 to 6 and an upper closed position according to FIG. 7, and may comprise guide elements, for example guide ribs 51, for this purpose. The valve body 47 is vertically displaceably guided with its upper pin-shaped part 50 in the valve opening 43 with clearance, wherein an annular gap remains between the pin-shaped part 50 and the valve opening 43 for the passage of gas in the open state. The outer diameter of the pin-shaped part 50 is in particular at least 10% smaller than the inner diameter of the valve opening 43. The float chamber 35 is connected to the atmosphere opening 21 in a fluid-conducting manner. In particular, the atmosphere opening 21 can be provided in a wall of the housing 11 bounding the float chamber 35, see FIGS. 4, 5. The atmosphere opening 21 is preferably arranged at the level of the bottom 49 of the float chamber 35.

Figure 7:
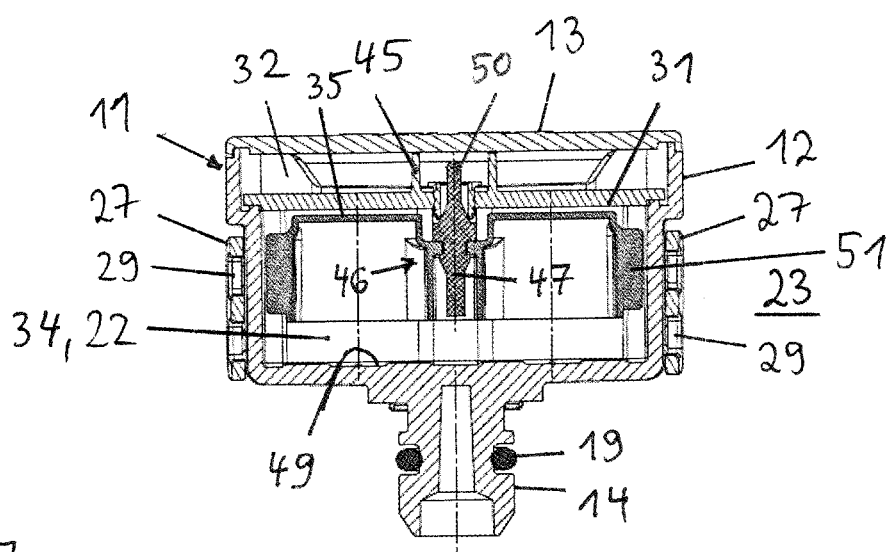
FIG. 7 a cross-sectional view analogous to FIG. 6 with the float valve closed.

When the atmosphere opening 21 is under water, the water enters the float chamber 34 through the atmosphere opening 21. The rising water level in the float chamber 34 causes the float 35 and, with it, the valve body 47 to rise until a closing section 52 of the valve body 47, which widens, for example, from top to bottom, comes into sealing contact with the valve seat 48, thereby closing the valve opening 43 in a liquid-tight (and gas-tight) manner and preventing water from entering the upper region 32 and ultimately the transmission 55. This closed state is shown in FIG. 7.

When the atmosphere opening 21 is no longer under water, the water can flow out of the float chamber 34 into the environment 23 through the atmosphere opening 21. For this purpose, a filter cover 26, if provided, advantageously comprises a drain opening 53 at the level of the atmosphere opening 21, through which water escaping from the atmosphere opening 21 can drain off into the surroundings. The drain opening 53 can serve as an air passage opening 30 during normal operation when there is no water in the float chamber 34. Due to the decreasing water level, the float 35 lowers and so does the valve body 47, which as a result clears the valve opening 43. When the state achieved in FIGS. 3 to 6 has been reached again and the water has flowed out of float chamber 34 at least to such an extent that atmosphere opening 21 is unobstructed again, gas can flow through valve opening 43 and atmosphere opening 21 again for venting and aerating transmission 55.

The valve body 47 is preferably made of an elastomer or a thermoplastic elastomer (TPE). The separating element 31 forming the valve seat 48 is advantageously made of a thermoplastic, for example by means of injection molding. The material combination described above is favorable because elastomer or TPE seals well against thermoplastic. The float 35 can advantageously be made of a thermoplastic. The float 35 may be open at the bottom, as in the embodiment shown in the figures. The float 35 may also be closed at the bottom and thus closed altogether.

In the following, the course of the gas flow through the gas channel 24 from the connection opening 15 to the atmosphere opening 21 (venting) and from the atmosphere opening 21 to the connection opening 15 (aeration) is described, wherein it is assumed that the float 35 is in the down position and no water is in the float chamber 34.

In the venting case, gas flows from the transmission through the connection opening 15 into the gas channel 24. The gas channel 24 comprises a connection-side channel section 54 (see FIG. 3), which connects the connection opening 15 with the gas passage opening 39 in a gas-conducting manner. The connection-side channel section 54 can be tubular, for example. The vent gas flows through the connection-side channel section 54, passes through the gas passage opening 39 in the separating element 31, and then passes through the oil separating device 16 in the separating chamber 32. The gas cleaned by the oil separating device 16 exits downwardly from the separating chamber 32 through the valve opening 43 and enters the float chamber 34, from where it exits through the atmosphere opening 21 and the filter element 25 and, if necessary, the air passage opening 30 into the environment 23.

In the case of aeration, gas from the environment flows into the float chamber 34, possibly through the air passage opening 30 and through the filter element 25 and the atmosphere opening 21, passes through this and then flows through the valve opening 47 into the separation chamber 32, flows through this in the opposite direction to the direction of separation, and finally enters through the gas passage opening 39 into the connection-side channel section 54 and from there through the connection opening 15 finally into the transmission 55.

The float 35 and the float valve 46 are actuated exclusively by the water level in the float chamber 34. The gas pressure (negative or positive) present in the transmission 55 relative to the atmospheric pressure has no influence on the position of the float 35 and the state of the float valve 46.

LIST OF REFERENCE SIGNS

10 ventilation module
11 housing
12 base body
13 cover
14 connection element
15 connection opening
16 fastening element
17 latching hook
18 actuating element
19 sealing element
20 annular groove
21 atmosphere opening
22 interior
23 environment
24 gas channel
25 filter element
26 filter cover
27 latching element
28 spacer element
29 latching protrusion
30 air passage opening
31 separating element
32 upper region
33 lower region
34 float chamber
35 float
36 oil separating device
37 impact separator
38 impact element
39 passage opening
40 retaining element
41 oil reservoir
42 oil drain opening
43 valve opening
44 collar
5 guiding device
46 float valve
47 valve body
48 valve seat
49 bottom
50 pin-shaped part
51 guide ribs
52 closing section
53 drain opening
54 connection-side channel section Embodiments Embodiment 1. Ventilation module (10) for a transmission (55) of a motor vehicle, in particular an electrically driven vehicle, comprising a housing (11) with a connection opening (15) on the transmission side and an atmosphere opening (21) open to the environment (23), wherein a gas channel (24) connecting the connection opening (15) to the atmosphere opening (21) in a gas-conducting manner is provided in the housing (11), characterized in that a float valve (46) with a float (35) arranged in a float chamber (34), valve body (47) and a valve opening (43) is arranged in the gas channel (24), wherein liquid entering the float chamber (34) through the atmosphere opening (21) causes the float (35) to rise, wherein when a certain liquid level in the float chamber (34) is exceeded, the float (35), the valve body (47) connected to the float (35), closes the valve opening (43) and thereby the gas channel (24) in a liquid-tight manner.

Embodiment 2. Ventilation module according to embodiment 1, characterized in that an oil separator device (36) is arranged in the gas channel (24) for separating oil components from vent air flowing from the connection opening (15) to the atmosphere opening (21).

Embodiment 3. Ventilation module according to embodiment 2, characterized in that the oil separating device (36) comprises an impact separator (37) with an impact element (38), in particular an impactor fleece.

Embodiment 4. Ventilation module according to embodiment 2 or 3, characterized in that the oil separating device (36) comprises a guiding device (45) for diverting the gas flow to improve the separation efficiency.

Embodiment 5. Ventilation module according to any one of embodiments 2 to 4, characterized in that the oil separating device (36) is arranged in the venting direction between the connection opening (15) and the float valve (46).

Embodiment 6. Ventilation module according to any one of embodiments 2 to 5, characterized in that a drain-free oil reservoir (41) is arranged in the housing (11) in such a way that oil separated by the oil separating device (36) flows into the oil reservoir (21) by gravity.

Embodiment 7. Ventilation module according to any one of the preceding embodiments, characterized in that a separating element (31) is arranged in the housing (11), which separates an interior (22) of the housing (11) into an upper region (32) and a lower region (33) in which the float chamber (34) is arranged.

Embodiment 8. Ventilation module according to embodiment 7, characterized in that the separating element (31) comprises one or more of the following features:
- a valve seat (48) for the valve body (47) surrounding the valve opening (43);
- at least one retaining element (40) for retaining the impact element (38) according to embodiment 3;
- a gas passage opening (39) directed in particular towards the impact element (38) according to embodiment 3;
- an oil drain opening (42) for draining oil from the upper region (32) into the oil reservoir (41) according to embodiment 6.

Embodiment 9. Ventilation module according to embodiment 8, characterized in that the gas passage opening (39) and/or the valve opening (43) are surrounded by a collar (44).

Embodiment 10. Ventilation module according to any one of the preceding embodiments, characterized in that the valve body (47) consists of an elastomer or a thermoplastic elastomer.

Embodiment 11. Ventilation module according to any one of the preceding embodiments, characterized in that the valve body (47) comprises a pin-shaped part (50) which is displaceably guided with clearance in the valve opening (43).

Embodiment 12. Ventilation module according to any one of the preceding embodiments, characterized in that a filter element (25) covering the atmosphere opening (21) is provided.

Embodiment 13. Ventilation module according to embodiment 12, characterized in that a filter cover (26) for holding the filter element (25) is provided between the filter cover (26) and the housing (11).

Embodiment 14. Ventilation module according to any one of the preceding embodiments, characterized in that a connecting element (14) for connecting the ventilation module (10) to the transmission (55) is provided in the region of the connecting opening (15).

Embodiment 15. Ventilation module according to any one of the preceding embodiments, characterized in that a sealing element (19) is provided for sealing the connection opening (15).

Embodiment 16. Ventilation module according to any one of the preceding embodiments, characterized in that a fastening element (16) is provided on the housing (11) for detachably fastening the ventilation module (10) to the transmission (55).

The invention claimed is:

1. A ventilation module for a transmission of a motor vehicle, comprising a housing with a connection opening on the transmission side and an atmosphere opening open to the environment, wherein a gas channel connecting the connection opening to the atmosphere opening in a gas-conducting manner is provided in the housing, wherein a float valve with a float arranged in a float chamber, valve body and a valve opening is arranged in the gas channel, wherein liquid entering the float chamber through the atmosphere opening causes the float to rise, wherein when a certain liquid level in the float chamber is exceeded, the float, and the valve body connected to the float, closes the valve opening and thereby the gas channel in a liquid-tight manner; wherein an oil separator device is arranged in the gas channel for separating oil components from vent air flowing from the connection opening to the atmosphere opening; and wherein a drain-free oil reservoir is arranged in the housing in such a way that oil separated by the oil separating device flows into the oil reservoir by gravity.

2. The ventilation module according to claim 1, wherein the oil separating device comprises an impact separator with an impact element.

3. The ventilation module according to claim 2, wherein the impact element is an impactor fleece.

4. The ventilation module according to claim 1, wherein the oil separating device comprises a guiding device for diverting the gas flow to improve the separation efficiency.

5. The ventilation module according to claim 1, wherein the oil separating device is arranged in the venting direction between the connection opening and the float valve.

6. The ventilation module according to claim 1, wherein a separating element is arranged in the housing, which separates an interior of the housing into an upper region and a lower region in which the float chamber is arranged.

7. The ventilation module according to claim 6, wherein an oil separator device is arranged in the gas channel for separating oil components from vent air flowing from the connection opening to the atmosphere opening and wherein a drain-free oil reservoir is arranged in the housing in such a way that oil separated by the oil separating device flows into the oil reservoir by gravity, and wherein the oil separating device comprises an impact separator with an impact element, and the separating element comprises at least one of the following features:
- a valve seat for the valve body surrounding the valve opening;
- at least one retaining element for retaining the impact element;
- a gas passage opening directed towards the impact element; and
- an oil drain opening for draining oil from the upper region into the oil reservoir.

8. The ventilation module according to claim 7, wherein the gas passage opening and/or the valve opening are surrounded by a collar.

9. The ventilation module according to claim 1, wherein the valve body consists of an elastomer or a thermoplastic elastomer.

10. The ventilation module according to claim 1, wherein the valve body comprises a pin-shaped part which is displaceably guided with clearance in the valve opening.

11. The ventilation module according to claim 1, wherein a filter element covering the atmosphere opening is provided.

12. The ventilation module according to claim 11, wherein a filter cover for holding the filter element is provided between the filter cover and the housing.

13. The ventilation module according to claim 1, wherein a connecting element for connecting the ventilation module to the transmission is provided in the region of the connecting opening.

14. The ventilation module according to claim 1, wherein a sealing element is provided for sealing the connection opening.

15. The ventilation module according to claim 1, wherein a fastening element is provided on the housing for detachably fastening the ventilation module to the transmission.

16. The ventilation module according to claim 1, wherein the motor vehicle is an electrically driven vehicle.

17. A ventilation module for a transmission of a motor vehicle, comprising a housing with a connection opening on the transmission side and an atmosphere opening open to the environment, wherein a gas channel connecting the connection opening to the atmosphere opening in a gas-conducting manner is provided in the housing, wherein a float valve with a float arranged in a float chamber, valve body and a valve opening is arranged in the gas channel, wherein liquid entering the float chamber through the atmosphere opening causes the float to rise, wherein when a certain liquid level in the float chamber is exceeded, the float, and the valve body connected to the float, closes the valve opening and thereby the gas channel in a liquid-tight manner, wherein a separating element is arranged in the housing, which separates an interior of the housing into an upper region and a lower region in which the float chamber is arranged; wherein an oil separator device is arranged in the gas channel for separating oil components from vent air flowing from the connection opening to the atmosphere opening and wherein a drain-free oil reservoir is arranged in the housing in such a way that oil separated by the oil separating device flows into the oil reservoir by gravity, and wherein the oil separating device comprises an impact separator with an impact element, and the separating element comprises at least one of the following features:

a valve seat for the valve body surrounding the valve opening;

at least one retaining element for retaining the impact element;

a gas passage opening directed towards the impact element; and an oil drain opening for draining oil from the upper region into the oil reservoir.

18. A ventilation module for a transmission of a motor vehicle, comprising a housing with a connection opening on the transmission side and an atmosphere opening open to the environment, wherein a gas channel connecting the connection opening to the atmosphere opening in a gas-conducting manner is provided in the housing, wherein a float valve with a float arranged in a float chamber, valve body and a valve opening is arranged in the gas channel, wherein liquid entering the float chamber through the atmosphere opening causes the float to rise, wherein when a certain liquid level in the float chamber is exceeded, the float, and the valve body connected to the float, closes the valve opening and thereby the gas channel in a liquid-tight manner; and wherein the valve body comprises a pin-shaped part which is displaceably guided with clearance in the valve opening.

* * * * *